Feb. 12, 1952　　　F. B. SMALL　　　2,585,507
POWER ACTUATOR WITH PILOT CONTROL
Filed June 23, 1949　　　3 Sheets-Sheet 1

INVENTOR.
FREDERICK B. SMALL
BY
Chas. T. Hawley
Att'y.

Feb. 12, 1952     F. B. SMALL     2,585,507
POWER ACTUATOR WITH PILOT CONTROL

Filed June 23, 1949     3 Sheets-Sheet 2

INVENTOR.
FREDERICK B. SMALL
BY
Chas. T. Hawley
Atty.

Feb. 12, 1952          F. B. SMALL          2,585,507
POWER ACTUATOR WITH PILOT CONTROL
Filed June 23, 1949          3 Sheets-Sheet 3
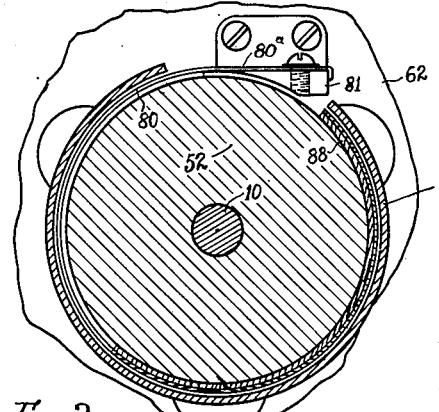
Fig. 3
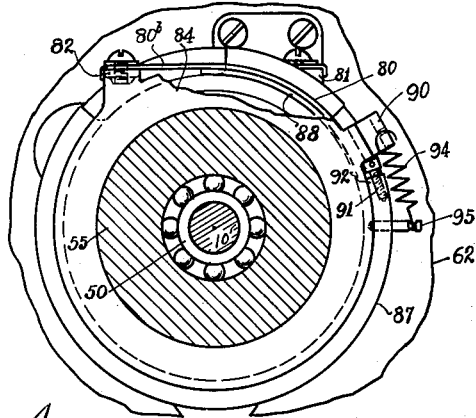
Fig. 4
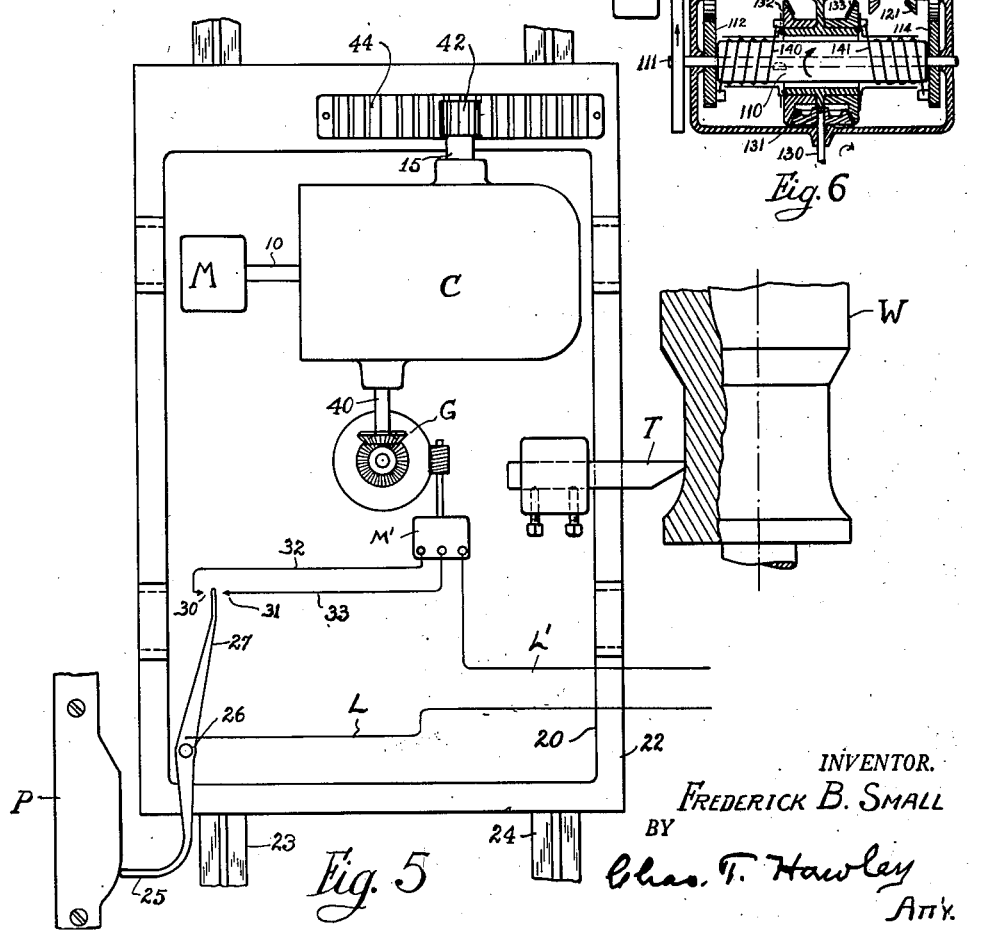
Fig. 5
Fig. 6
INVENTOR.
FREDERICK B. SMALL
BY
Chas. T. Hawley
Atty.

Patented Feb. 12, 1952

2,585,507

UNITED STATES PATENT OFFICE 2,585,507

POWER ACTUATOR WITH PILOT CONTROL

Frederick B. Small, Waterloo, N. Y., assignor to Seneca Falls Machine Company, Seneca Falls, N. Y., a corporation of Massachusetts Application June 23, 1949, Serial No. 100,905

8 Claims. (Cl. 74—388)

1

This invention relates to a driving mechanism in which a continuously rotated power member may be rendered operative or inoperative with respect to a member to be driven, by the functioning of a relatively small pilot or control device.

In the preferred construction, a continuously rotated power shaft is provided, which power shaft may be coupled to turn an output shaft in either direction as determined by the pilot or control device.

It is the general object of my invention to provide an improved construction by which the power shaft may be selectively connected to the output shaft under the control of the pilot device and through alternative driving mechanisms. The pilot device in my improved actuator does not function to drive the output shaft direct but operates only under very light load to selectively connect the power shaft to the output shaft.

I also provide a construction in which a driving member or members continuously rotate in one direction and may be selectively connected under pilot control to turn the output shaft in either direction.

My invention further relates to arrangements and combinations of parts which will be hereinafter described and more particularly pointed out in the appended claims.

A preferred form of the invention is shown in the drawings, in which

Figure 1:
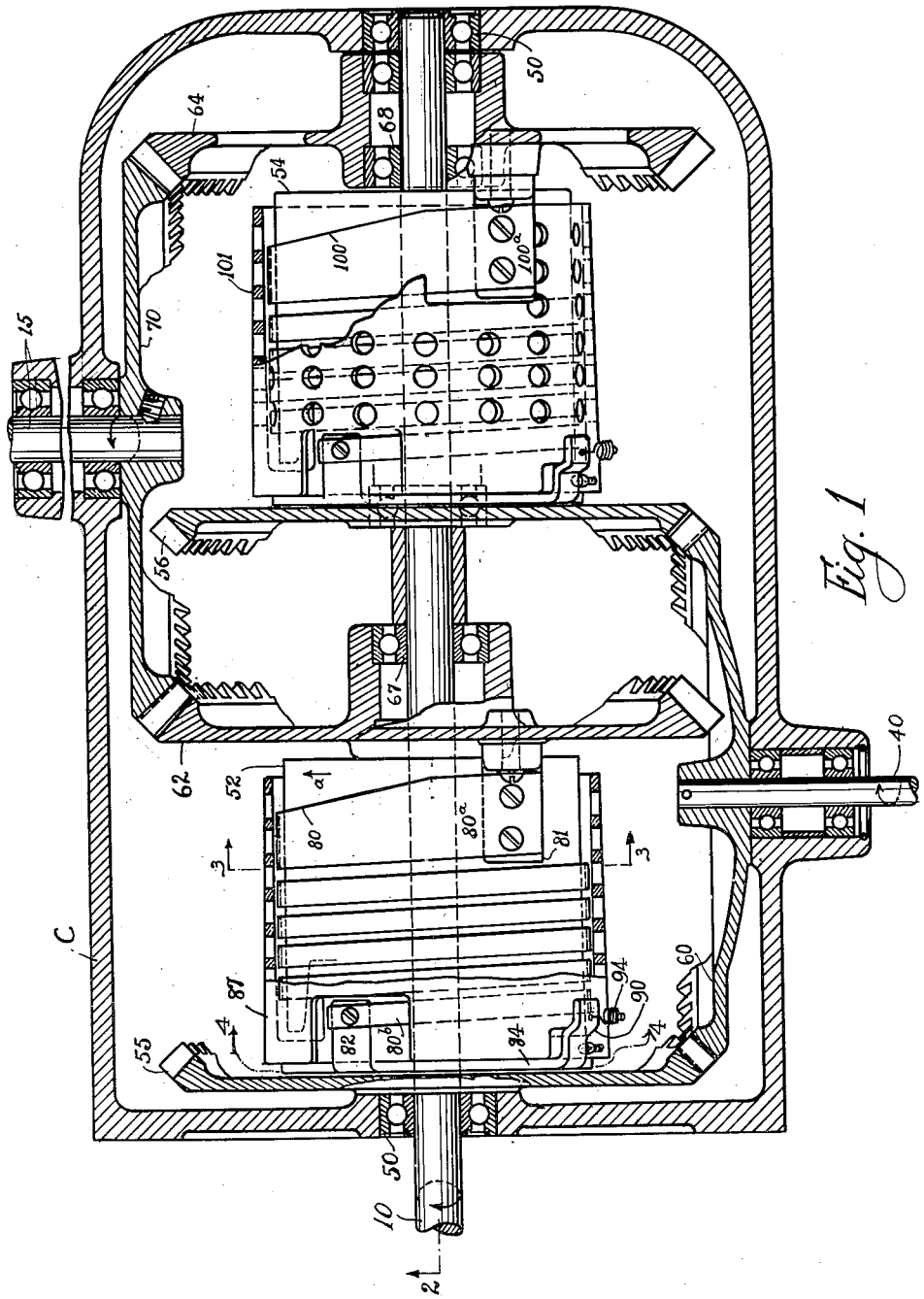
Fig. 1 is a sectional plan view of my improved power actuator.

Figs. 3 and 4 are detail sectional views, taken along the lines 3—3 and 4—4 in Fig. 1;

Fig. 5 is a diagrammatic view illustrating the application of my invention to contour lathe operation; and Fig. 6 is a sectional plan view showing a modified construction.

Referring to Figs. 1 to 4, my improved power actuator in its preferred form comprises a casing C supporting an input or power shaft 10 which may be continuously rotated by a motor M (Fig. 5), or which may be rotated from any other convenient source of power. An output shaft 15 is also mounted in the casing C and is normally stationary but is rotated in a selected direction when coupled to the power shaft 10 through the control device to be described.

One application of this invention is illustrated

2 in Fig. 5, in which the invention is shown as controlling the transverse position of a lathe tool T with respect to a rotated piece of work W, as in a contour lathe. The tool T is mounted on a cross slide 20 slidable crosswise on a carriage 22 which is moved longitudinally of the work on guideways 23 and 24.

A pattern plate P is mounted in fixed position and coacts with a detector or follower 25 pivoted at 26 on the cross slide 20 and having an insulated index arm 27 connected to a line wire L.

The free end of the arm 27 makes selective contacts with terminals 30 and 31 which are connected to a relatively small control motor M' through wires 32 and 33. The motor M' is also connected to a second line wire L' and is of the reversible type which will be rotated clockwise or anti-clockwise according as one or the other of the contacts is engaged by the arm 27 under control of the pattern plate P.

The motor M' is connected through reduction gearing G to a control shaft 40 rotatably mounted in a suitable bearing secured to the front of the casing C. The output shaft 15 is shown as provided with a pinion 42 engaging a rack 44 mounted on the carriage 22.

The operation of this illustrative mechanism may be briefly described as follows:

As the carriage 22 is moved longitudinally along the guideways 23 and 24, the detector or follower 25 follows the contour of the fixed pattern plate P. As the contour changes, the arm 27 swings to the right or left to engage one or the other of the contacts 30 and 31. This causes the motor M' to rotate the control shaft 40 either clockwise or anti-clockwise. This movement of the shaft 40 then causes the power shaft 10 to rotate the output shaft 15 and pinion 42 through mechanism to be described, thus moving the tool T toward or away from the work W under the control of the pattern plate P, detector 25 and motor M'.

It will be understood that the application of the invention shown in Fig. 5 and above described is illustrative only, and that the invention is well adapted for more general application.

Figure 2:
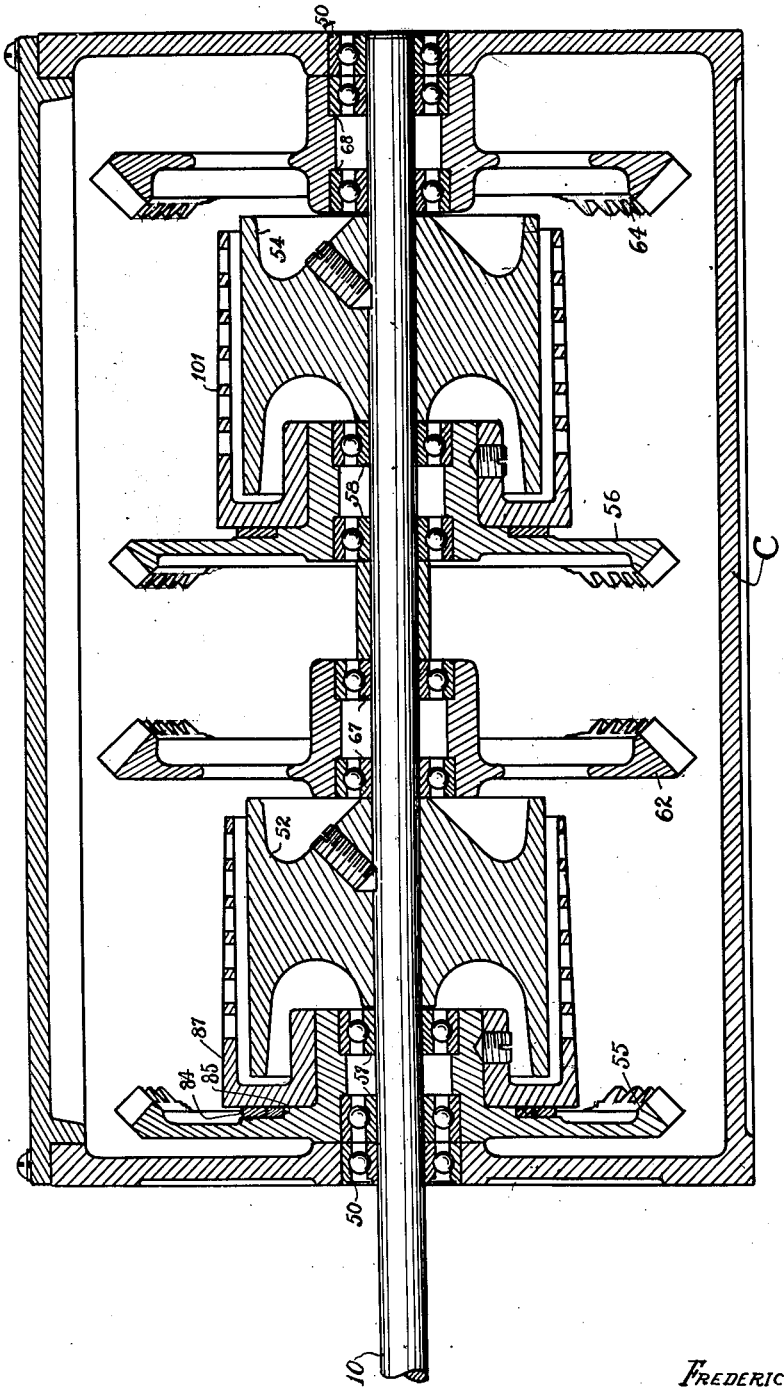
Fig. 2 is a sectional elevation, taken along the line 2—2 in Fig. 1, and with certain parts omitted.

Having made clear a desired result to be obtained by use of my improved power actuator, the details of construction of the power actuator are as follows:

Referring particularly to Figs. 1 and 2, the power shaft 10 is mounted in bearings 50 in the ends of the casing C and continuously rotates a pair of drums 52 and 54 mounted thereon.

A bevel gear 55 is mounted at the left of the drum 52 as viewed in Fig. 2, and a similar but oppositely facing bevel gear 56 is mounted at the left of the drum 54. The gears 55 and 56 are freely rotatable on bearings 57 and 58 supported by the shaft 10. A third bevel gear 60 (Fig. 1) is mounted on the inner end of the control shaft 40 and meshes with both bevel gears 55 and 56.

Rotation of the shaft 40 and bevel gear 60 will thus cause both driven bevel gears 55 and 56 to be correspondingly rotated but in opposite directions, with one of the driven gears turning clockwise and the other anti-clockwise.

Additional bevel gears 62 and 64 are positioned adjacent the right-hand ends of the drums 52 and 54 and are freely rotatable on bearings 67 and 68, also supported on the shaft 10. The gears 62 and 64 engage a bevel gear 70 mounted on the inner end of the output shaft 15 and secured thereto.

A tapered flat driving band 80 (Fig. 1) loosely encircles the drum 52 and has its wide end 80a attached to a bracket 81 mounted on the adjacent face of the bevel gear 62. The narrow end 80b of the band 80 is secured to an arm 82 extending laterally from a flat disc 84 which is frictionally mounted on a bearing shoulder 85 (Fig. 2) on the inner face of the bevel gear 55.

A perforated cage 87 (Figs. 1 and 2) is secured to the inner face of the gear 55 and encloses the spiral band 80. The band 80 preferably has a thin cork lining 88 (Fig. 4) which engages the drum 52 but normally has slight clearance.

An arm 90 (Fig. 1) projects laterally from the disc 84 and is engaged by an adjusting screw 91 (Fig. 4) mounted in a lug 92 projecting from the side of the cage 87. A spring 94 holds the arm 90 firmly in engagement with the end of the screw 91. One end of the spring 94 is connected to a pin 95 also mounted in the end of the cage 87.

A similar band 100 is mounted within a cage 101 supported by the bevel gear 56, and the wide end 100a of the band 100 is connected to a bracket mounted on the loose bevel gear 64, the details of construction being the same as for the band 80 mounted on the drum 52.

Having described the details of construction of my improved power actuator, the operation and utility thereof is as follows:

The power shaft 10 continuously rotates the drums 52 and 54, both in the same direction, and as indicated by the arrow a on the drum 52. The bevel gears 55, 56, 62 and 64 are all mounted concentric with the shaft 10 but free therefrom and normally stationary. If the control shaft 40 is displaced angularly in either direction, the bevel gears 55 and 56 will be similarly displaced but in opposite directions.

Assuming that the control shaft 40 is displaced clockwise, the bevel gear 55 will be similarly displaced clockwise, and the band 80 will be tightened about the drum 52. The drum 52 will then turn the band 80 and the bevel gear 62 in the same direction and to the same extent, thus rotating the output shaft 15. When a corresponding displacement of the output shaft 15 has been accomplished, the band 80 will be loosened from the drum 52 and the shaft 15 will come to rest.

If the control shaft 40 is displaced in the opposite direction, the band 100 on the drum 54 will be tightened, thus rotating the gear 64 clockwise and producing a reverse displacement of the shaft 15.

It is thus possible to selectively connect the band 80 or the band 100 to its associated drum 52 or 54 and to thereby effect power-actuated movements of the output shaft 15 corresponding to the movements of the control shaft 40 but without imposing any substantial load on the control shaft.

In the construction shown in Figs. 1 to 4, the movement of the output shaft 15 will be in the opposite direction to the movement of the control shaft 40, but in the modified construction shown in Fig. 6, the control and output shafts rotate in the same direction.

In this modification, a single drum 110 is secured to a power shaft 111 rotatable in bearings in a casing C2 and continuously rotated by a motor M2. Gears 112 and 114 are loosely mounted on the shaft 111 and engage gears 116 and 117 on countershafts 118 and 119.

Bevel gears 120 and 121 are mounted on the countershafts 118 and 119 respectively and both engage a third bevel gear 122 on the output shaft 125. A control shaft 130 is mounted in a bearing in the casing C2 and rotates a bevel gear 131 mounted between and engaging bevel gears 132 and 133 freely rotatable on bearings concentric with the drum 100 but spaced therefrom.

Spiral bands 140 and 141 loosely surround opposite end portions of the drum 110 and are connected between the gears 112 and 132 and between the gears 114 and 133 respectively. The details of construction of the bands 140 and 141 and their associated parts may be identical with the construction of the corresponding parts shown in Figs. 1 to 4.

The operation in this modification is similar to that of the construction shown in Figs. 1 to 4. Angular displacement of the control shaft 130 rotates the gears 132 and 133 in opposite directions and tightens one or the other of the bands 140 and 141 on the drum 110. Resultant rotation of the gear 112 or the gear 114 is then transmitted through its associated countershaft to the output shaft 125, which in this case is rotated in the same direction as the displacement of the control shaft 130.

Having thus described my invention and the advantages thereof, I do not wish to be limited to the details herein disclosed, otherwise than as set forth in the claims, but what I claim is:

1. A power actuator comprising a continuously rotated power shaft, an output shaft, power-transmitting means mounted on and continuously rotated by said power shaft and comprising axially-spaced cylindrical operative portions rotated in the same direction, a spiral band loosely encircling one of said operative portions, gearing connecting one end of said spiral band to said output shaft, a second spiral band loosely encircling the second operative portion, reverse gearing connecting one end of said second spiral band to said output shaft, a normally-stationary pilot device, and connections from said pilot device to the second end of each band, said pilot device being effective to tighten a selected band on its associated operative portion by rotary movement of said pilot device in a selected direction, and said power shaft and transmitting means being effective through said selected band and associated gearing to turn said output shaft in a coordinated direction until movement of said pilot device ceases and until the selected band is loosened by further turning movement of said transmitting means.

2. The combination in a power actuator as set forth in claim 1, in which a hollow cylindrical cage encloses each band and limits the expansion and clearance thereof, and in which means is provided to connect said cage to the normally-stationary pilot device and to cause said cage to rotate with said pilot device when the pilot device is operative.

3. The combination in a power actuator as set forth in claim 1, in which said pilot device comprises a normally-stationary control shaft, and selectively-operative automatic means to rotate said control shaft in an indicated direction.

4. The combination in a power actuator as set forth in claim 1, in which the pilot device and its operative connection comprises a control shaft, a pair of gears mounted coaxially with said power shaft but free therefrom and each gear being connected to the second end of one of said bands, and a gear connection from said control shaft effective to rotate said pair of gears in unison and in the same selected direction as determined by the direction of rotation of said control shaft.

5. The combination in a power actuator as set forth in claim 1, in which the pilot device comprises a control shaft, a pair of oppositely-facing bevel gears mounted coaxially with said power shaft but free therefrom and each gear being connected to the second end of one of said bands, and a bevel gear mounted on said control shaft and simultaneously engaging both of said first-named gears to turn said gears in the same selected direction.

6. The combination in a power actuator as set forth in claim 1, in which the operative connections from said bands to the output shaft comprises a pair of gears loosely mounted concentric with said power shaft and each connected to the first mentioned end of one of said bands, and both of said gears being connected to positively rotate said output shaft in a selected direction.

7. The combination in a power actuator as set forth in claim 1, in which the spaced portions of the power-transmitting means are axially aligned parts of a single driving drum.

8. The combination in a power actuator as set forth in claim 1, in which the spaced portions of the power-transmitting means are axially aligned parts of a single driving drum, and in which the means operatively connecting the pilot device and said bands has supporting structure spaced transversely from and independent of said power shaft and transmitting means.

FREDERICK B. SMALL.

REFERENCES CITED

The following references are of record in the file of this patent:

UNITED STATES PATENTS

| Number | Name | Date |
| --- | --- | --- |
| 1,948,617 | Hoagland | Feb. 27, 1934 |
| 2,377,819 | Smith | June 5, 1945 |

FOREIGN PATENTS

| Number | Country | Date |
| --- | --- | --- |
| 255,640 | Italy | Oct. 29, 1927 |
| 377,938 | France | Sept. 19, 1907 |
| 526,314 | Great Britain | Sept. 16, 1940 |